(12) United States Patent
Yu et al.

(10) Patent No.: US 12,665,497 B2
(45) Date of Patent: Jun. 23, 2026

(54) DRIVING CIRCUIT DEVICE AND DRIVING METHOD OF TOTEM-POLE POWER FACTOR CORRECTION CONVERTER

(71) Applicant: AcLeap Power Inc., Taipei City (TW)

(72) Inventors: Qixue Yu, Shanghai (CN); Kun Dou, Shanghai (CN)

(73) Assignee: OmniOn Power Technology GmbH, Baden (CH)

( * ) Notice: Subject to any disclaimer, the term of this patent is extended or adjusted under 35 U.S.C. 154(b) by 317 days.

(21) Appl. No.: 18/441,243

(22) Filed: Feb. 14, 2024

(65) Prior Publication Data

US 2024/0291381 A1 Aug. 29, 2024

(30) Foreign Application Priority Data

Feb. 28, 2023 (CN) .......................... 202310211841.6

(51) Int. Cl.
*H02M 1/42* (2007.01)
*H02M 1/00* (2006.01)

(52) U.S. Cl.
CPC ....... *H02M 1/4208* (2013.01); *H02M 1/0009* (2021.05); *H02M 1/0058* (2021.05); *H02M 1/4225* (2013.01); *H02M 1/4233* (2013.01)

(58) Field of Classification Search
CPC ............. H02M 1/0003; H02M 1/0009; H02M 1/0012; H02M 1/0025; H02M 1/0048; H02M 1/0054; H02M 1/0058; H02M 1/08; H02M 1/12; H02M 1/42; H02M 1/4208; H02M 1/4225; H02M 1/4233;
(Continued)

(56) References Cited

U.S. PATENT DOCUMENTS

| | | | | |
|---|---|---|---|---|
| 10,630,168 B1 * | 4/2020 | Wang | .................. | H02M 1/4233 |
| 2016/0134185 A1 * | 5/2016 | Wang | .................. | G01R 19/175 |
| | | | | 324/127 |

(Continued)

FOREIGN PATENT DOCUMENTS

CN 115664191 A * 1/2023

OTHER PUBLICATIONS

J. Sebastian, J. A. Cobos, J. M. Lopera, "The determination of the boundaries between continuous and discontinuous. Conduction modes in PWM DC -to-DC converters used as power factor preregulators", IEEE Trans. on Power. Electronics, vol. 10, No. 5, Sep. 1995.

*Primary Examiner* — Thienvu V Tran
*Assistant Examiner* — Shahzeb K Ahmad
(74) *Attorney, Agent, or Firm* — CKC & Partners Co., LLC

(57) ABSTRACT

In one embodiment, a driving circuit device for a totem pole power factor correction converter (PFC) includes: a controller configured to control an initial drive level of a switching tube of the converter; a current judgment circuit configured to determine whether the inductive current of the converter crosses zero or not; a selector configured to compare a power supply voltage of the converter with zero and select, based on a result of the comparison, one of an output level of the current judgment circuit and a preset logic level as an intermediate control level to be output; and an calculator configured to perform a logical operation on the intermediate control level and the initial drive level to generate a target drive level for driving the switching tube.

20 Claims, 7 Drawing Sheets

(58) Field of Classification Search
CPC ...... H02M 1/425; H02M 1/4258; H02M 7/12;
H02M 7/21; H02M 7/217; H02M 7/219;
H02M 7/537; H02M 7/538; H02M
7/5387; H02M 7/53871
See application file for complete search history.

(56) References Cited

U.S. PATENT DOCUMENTS

| | | | | |
|---|---|---|---|---|
| 2016/0241132 A1* | 8/2016 | Lin | .................... | H02M 1/4225 |
| 2019/0305671 A1* | 10/2019 | Matsuura | .............. | H02M 1/083 |
| 2020/0014296 A1* | 1/2020 | Guo | .................... | H02M 1/4233 |
| 2023/0163679 A1* | 5/2023 | Li | ....................... | H02M 1/4233 |
| | | | | 363/13 |
| 2024/0014733 A1* | 1/2024 | Chin | .................. | H02M 1/0054 |

* cited by examiner

DRIVING CIRCUIT DEVICE AND DRIVING METHOD OF TOTEM-POLE POWER FACTOR CORRECTION CONVERTER

CROSS-REFERENCE TO RELATED APPLICATIONS

This application claims priority to Chinese Patent Application No. 202310211841.6, filed Feb. 28, 2023, and titled DRIVING CIRCUIT DEVICE AND DRIVING METHOD OF TOTEM-POLE POWER FACTOR CORRECTION CONVERTER, which is hereby incorporated by reference in its entirety.

BACKGROUND

The present disclosure relates to the field of totem pole power factor correction converters, and more specifically, to a driving circuit device for a totem pole power factor correction converter, a totem pole power factor correction converter having the driving circuit device, and a driving method for a totem pole power factor correction converter.

In recent years, new semiconductor materials represented by silicon carbide (SiC) and gallium nitride (GaN) have emerged. The new semiconductor material has many advantages in thermal and electrical properties compared to the traditional semiconductor material silicon, and therefore are widely used in power switches as third-generation semiconductor devices. The third generation semiconductor devices using silicon carbide (SiC), or gallium nitride (GaN) are wide bandgap semiconductor devices (such as SiC MOS or GaN FET). They have many advantages over Si switching tubes, one of which is their body diodes (or equivalent body diodes) have fast reverse recovery (for SiC MOS) or no reverse recovery (for GaN FET). This feature provides a prerequisite for the widespread application of totem pole power factor correction (PFC, Power Factor Correction) converters with fixed switching frequency continuous conduction mode (CCM).

The totem pole PFC converter with fixed switching frequency CCM is a true bridgeless PFC topology. It has high efficiency and simple control, which is beneficial to the design of EMI (Electromagnetic Interference) filters. When the totem pole PFC converter works, it uses wide bandgap semiconductor devices (such as SiC MOS or GaN FET) that work at high frequencies (tens of kHz to hundreds of kHz) and diodes or switching tubes that work at power frequency (50 Hz/60 Hz), with inductors, capacitors, and resistors. PFC converters used in large power ranges mostly work in fixed-frequency continuous conduction mode (CCM, Continuous Conduction Mode), that is, the current flowing through the inductor is continuous. However, under light load conditions, in the area near the zero-crossing point of the input voltage, the PFC converter will operate in DCM (Discontinuous Conduction Mode) mode, that is, discontinuous conduction mode. As the load is further reduced, this area will gradually expand until it finally completely covers the entire power frequency cycle (see J. Sebastian, J. A. Cobos, J. M. Lopera, "The determination of the boundaries between continuous and discontinuous conduction modes in PWM DC-to-DC converters used as power factor preregulators", IEEE Trans. On Power Electronics, Vol. 10, No. 5, September 1995). Ideally, in DCM mode, after the current flowing through the inductor reaches zero, it continues to remain zero for a period of time, and then increases again after this period of time, making the current appear intermittent. The PFC converter also has a critical mode between the CCM mode and the DCM mode. At this time, the current flowing through the inductor begins to increase after reaching zero.

When the converter enters the DCM mode, since the driving voltages of the two high-frequency switching tubes in the totem pole PFC are usually designed to be complementary (ignoring the dead time), due to the freewheeling switch the driving voltage of the tube still exists when the inductive current drops to zero, causing it to continue conducting. This reverses the inductive current, causing additional losses and lowering the power factor (PF, Power Factor) value.

BRIEF DESCRIPTION

The present disclosure provides a driving circuit device for a totem pole power factor correction converter, which at least partially solves the aforementioned problems of the prior art.

According to the present disclosure, the driving circuit device for a totem pole power factor correction converter includes: a controller configured to control an initial drive level of a switching tube of the converter; a current judgment circuit configured to determine whether the inductive current of the converter crosses zero or not; a selector configured to compare a power supply voltage of the converter with zero and select, based on the result of the comparison, one of an output level of the current judgment circuit and a preset logic level as an intermediate control level to be output; and an calculator configured to perform a logical operation on the intermediate control level and the initial drive level to generate a target drive level for driving the switching tube. In one embodiment of the present disclosure, the preset logic level is a logic high level, and the logical operation is a logic AND operation.

By using the driving circuit device for a totem pole power factor correction converter according to the present disclosure, the unfavorable state of the inductive current zero-crossing reverse in the PFC converter in the DCM mode can be avoided, so as to eliminate the additional power losses and improve power factor.

In one embodiment of the present disclosure, the current judgment circuit includes a first comparator and a second comparator, and wherein the first comparator is configured to change, in response to the inductive current crossing zero from positive to negative, the output level from a logic high level to a logic low level, and the second comparator is configured to change, in response to the inductive current crossing zero from negative to positive, the output level from a logic high level to a logic low level. This enables the judgment of the inductive current to be realized in a simple manner, and the zero-crossing moment and zero-crossing direction of the inductive current can be determined promptly and accurately.

In one embodiment of the present disclosure, the selector includes a first selection switch and a second selection switch, and the intermediate control level includes a first intermediate control level output by the first selection switch and a second intermediate control level output by the second selection switch. In this way, the generation of intermediate control levels is achieved in a very simple and low-cost way.

In one embodiment of the present disclosure, the first selection switch is connected to the first comparator and is configured to: output, in response to the power supply voltage of the converter being less than zero, the preset logic level as the first intermediate control level; or output, in response to the power supply voltage of the converter being not less than zero, the output level of the first comparator as the first intermediate control level. The second selection switch is connected to the second comparator and is configured to: output, in response to the power supply voltage of the converter being not less than zero, the preset logic level as the second intermediate control level; or output, in response to the power supply voltage of the converter being less than zero, the output level of the second comparator as the second intermediate control level. Herein, the preset logic level is, for example, a logic high level. Here is a detailed description of how to generate the intermediate control levels. It can be seen that the generation manner of the intermediate control levels is very simple, thus greatly reducing the cost.

In one embodiment of the present disclosure, the switching tube at least includes a first switching tube and a second switching tube connected to each other, and the initial drive level output by the controller includes a first initial drive level for controlling the first switching tube and a second initial drive level for controlling the second switching tube. This is a simple implementation of the high-frequency half-bridge (composed of the first switching tube and the second switching tube) of the totem pole power factor correction converter.

In one embodiment of the present disclosure, the calculator includes a first AND gate and a second AND gate, the first AND gate is configured to perform an AND operation of the first intermediate control level and the first initial drive level, and the second AND gate is configured to perform an AND operation of the second intermediate control level and the second initial drive level. Thus, the adjustment of the initial drive level of the relevant switching tube is realized in a simple manner.

In one embodiment of the present disclosure, the target drive level includes a first target drive level output by the first AND gate and a second target drive level output by the second AND gate, the first target drive level is configured to drive the first switching tube, the second target drive level is configured to drive the second switching tube.

In one embodiment of the present disclosure, the first switching tube includes a plurality of first switching tubes connected in parallel, and the second switching tube includes a plurality of second switching tubes connected in parallel. Herein, the switching tubes are simply expanded, so that the driving circuit device can also be applied to the situation where multiple switching tubes are connected in parallel.

In one embodiment of the present disclosure, a plurality of half bridges composed of the first switching tube and the second switching tube are staggered and connected in parallel, wherein the plurality of half-bridges are connected in parallel with each other and an inductor is connected between the middle of each half-bridge and the power supply. Herein, the high-frequency half-bridge is simply expanded, so that the driving circuit device can also be applied to the situation where multiple high-frequency half-bridges are staggered and connected in parallel.

According to another aspect, the present disclosure also relates to a totem pole power factor correction converter comprising the aforementioned driving circuit device. The aspects and advantages described above with respect to the driving circuit device are correspondingly also applicable to the totem pole power factor correction converter, and the details are omitted here.

According to another aspect, the present disclosure also relates to a driving method for a totem pole power factor correction converter, including: generating an initial drive level of a switching tube of the converter; determining whether the inductive current of the converter crosses zero or not; generating a corresponding output level according to whether the inductive current crosses zero from positive to negative or from negative to positive; comparing a power supply voltage of the converter with zero and selecting, based on the result of the comparison, one of the output level and a preset logic level as an intermediate control level to be output; and performing a logical operation on the intermediate control level and the initial drive level and generating a target drive level for driving the switching tube. In one embodiment of the present disclosure, the preset logic level is a logic high level, and the logical operation is a logic AND operation. The aspects and advantages described above with respect to the driving circuit device are correspondingly also applicable to the driving method, and the details are omitted here.

BRIEF DESCRIPTION OF THE DRAWINGS

Other advantages and designs of the present disclosure are described in detail below with reference to the accompanying drawings, wherein.

DETAILED DESCRIPTION

Corresponding reference signs and symbols in the different figures generally refer to corresponding regions, unless otherwise indicated. The figures are drawn to clearly illustrate the relevant aspects of the embodiments and are not drawn to scale. The edges of features in the figures do not necessarily denote the end of the range of the feature.

In the following description, various specific details are shown in order to provide a thorough understanding of various examples of embodiments according to the description. Embodiments may be implemented without one or more of the specific details, or with other methods, components, materials, etc. In other instances, known structures, materials, or operations are not shown or described in detail but do not affect the embodiments.

As used throughout the specification, the term "an embodiment" or "one embodiment" is intended to indicate that a specific configuration, structure, or characteristic described with respect to the embodiment is included in at least one embodiment. Thus, the terms such as "in an embodiment" "in one embodiment" that may appear in various aspects of this specification do not necessarily all refer to exactly the same embodiment. Furthermore, specific configurations, structures or characteristics may be combined in any suitable manner in one or more embodiments.

The reference signs used herein are provided for the convenience of reading, and thus do not limit the scope of protection or the scope of the embodiments. Identical or similar elements are identified with the same reference sign.

The problem to be solved by this disclosure is to avoid the inductive current reversal of the PFC converter in DCM mode and eliminate the additional losses caused by it. To this end, the present disclosure stipulates that the driving voltage applied to the gate of the freewheeling switch is adjusted, so that the freewheeling switch is turned off in time when the inductive current crosses zero, thereby preventing the inductive current of the PFC converter from being reversed and flowing through the freewheeling switch, reducing the additional loss of the PFC converter, and improving its power factor.

Figure 1:
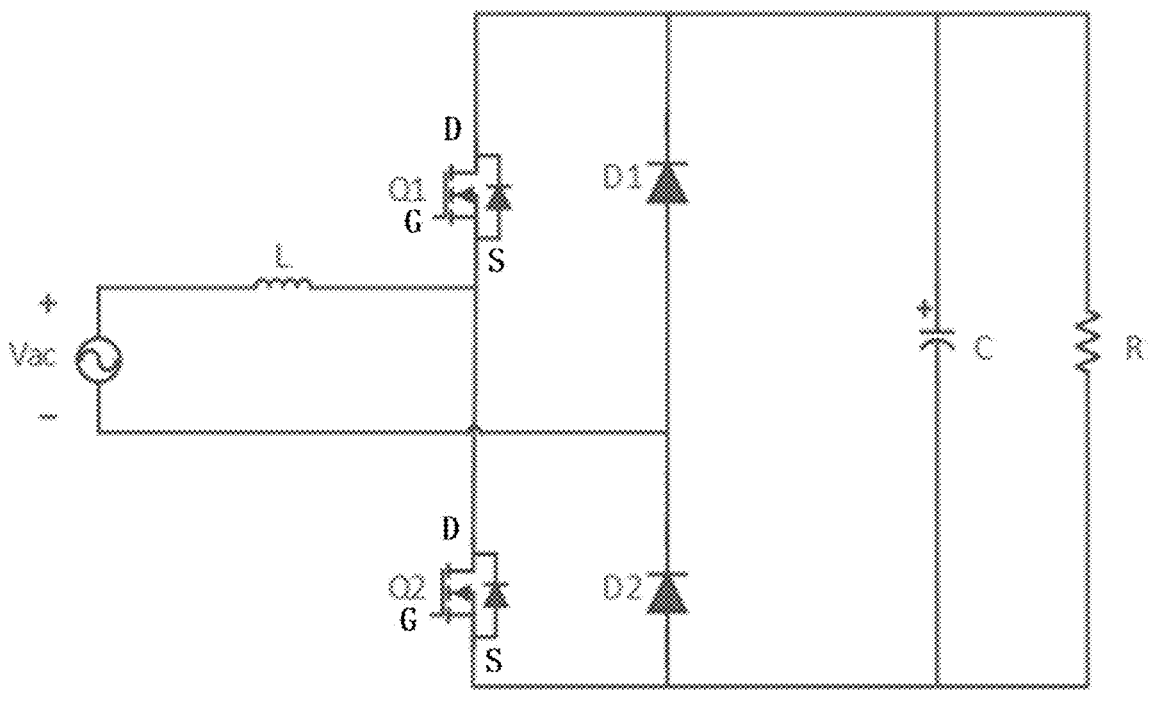
FIG. 1 schematically shows a circuit topology of a totem pole power factor correction converter.
Figure 2:
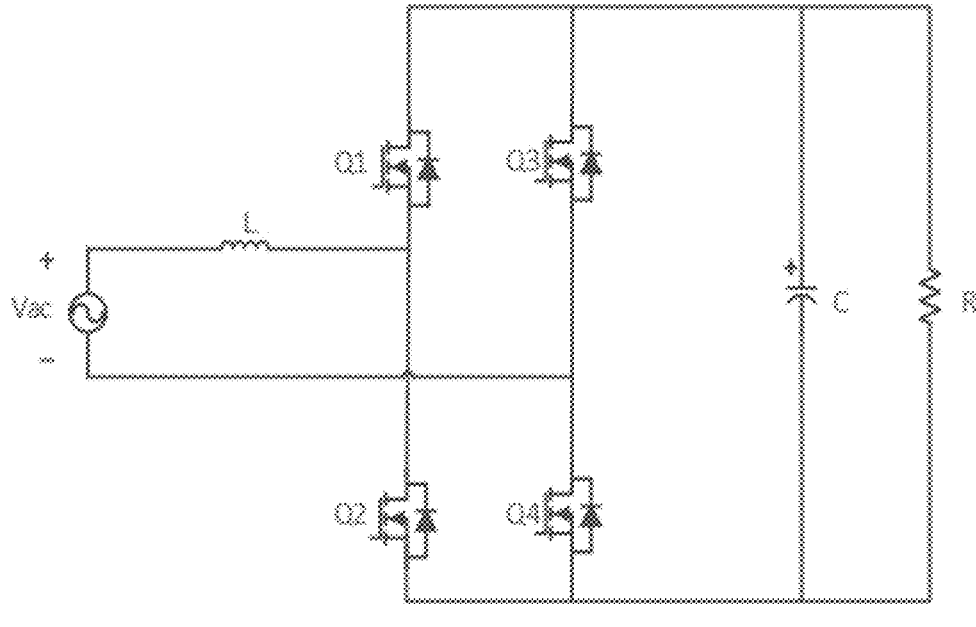
FIG. 2 schematically shows another circuit topology of a totem pole power factor correction converter.

First, referring to FIG. 1, in which a circuit topology of a totem pole power factor correction (PFC) converter is schematically shown. As shown in FIG. 1, the circuit topology exemplarily includes an AC power supply, an inductor L, and two high-frequency switching tubes (MOS, Metal Oxide Semiconductor) connected up and down in the shape of a totem pole, that is, a first switching tube Q1 and a second switching tube Q2, two diodes D1 and D2 connected up and down, a capacitor C and a resistor R. The switching tube herein can be a SiC MOS or a GaN FET or other switch tubes with good reverse recovery performance. Herein, the input voltage Vac is a single-phase AC voltage. The first switching tube Q1 and the second switching tube Q2 are wide bandgap semiconductor devices, such as SiC MOS or GaN FET, which operate at high frequencies up to tens of kHz or even hundreds of kHz. Therefore, the first switching tube Q1 and the second switching tube Q2 form a high-frequency half bridge. Diodes D1 and D2 operate at 50 Hz/60 Hz power frequency, thus forming a low-frequency half-bridge. FIG. 1 shows a typical circuit topology of a totem pole power factor correction (PFC) converter. However, diodes D1 and D2 in FIG. 1 can also be replaced with switching tubes Q3 and Q4 that also work at power frequency, as shown in another circuit topology in FIG. 2. The functions of switches Q3 and Q4 in FIG. 2 are the same as those of diodes D1 and D2 in FIG. 1. As mentioned before, according to the inductive current, the totem pole PFC converter is divided into three operating modes: CCM mode, DCM mode and critical mode. Among them, the CCM mode with fixed switching frequency is the most commonly used mode. The following will take the circuit topology shown in FIG. 1 and the positive half-wave of the input voltage Vac (that is, Vac>0) as an example, and combine FIGS. 3 to 6 to introduce the problems that will occur in the DCM mode to be solved by the present disclosure.

Figure 6:
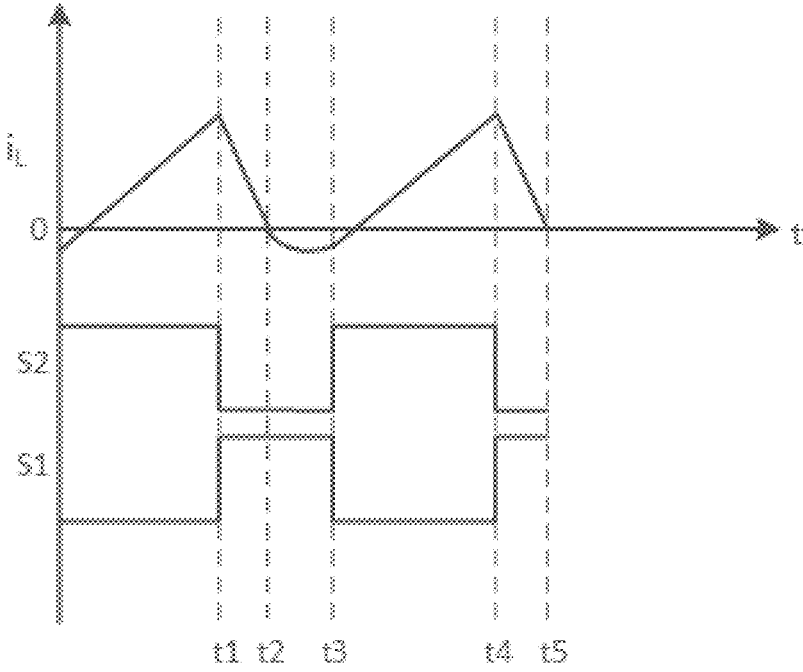
FIG. 6 is a schematic diagram of the timing corresponding to the initial drive level of the switching tube of the converter and the inductive current in the case of FIG. 5.

FIG. 6 shows the first initial drive level S1 and the second initial drive level S2 respectively applied to the gate G of the first switching tube Q1 and the second switching tube Q2 in the prior art, and the timing relationship of the inductive current $i_L$ flowing through the inductor L. When the first initial drive level S1 and the second initial drive level S2 are logic high level, the first switching tube Q1 and the second switching tube Q2 are turned on accordingly, and when the first initial drive level S1 and the second initial drive level S2 are logic low level, the first switching tube Q1 and the second switching tube Q2 are turned off accordingly. It should be noted that the inductive current $i_L$ flowing through the inductor L shown in FIG. 6 was measured at the above-mentioned high frequency of the first switching tube Q1 and the second switching tube Q2, so it shows a shape similar to a saw tooth wave, similar to measuring at a microscopic perspective in a very small time scale. But at the above-mentioned power frequency, it shows a sine wave shape that is basically the same as the input voltage Vac, which is similar to a macroscopic perspective measurement in a relatively large time scale. As mentioned before, in the traditional control scheme, the first initial drive level S1 and the second initial drive level S2 are basically designed to be complementary (ignoring the dead time), as shown in FIG. 6, and can be generated by a controller or DSP (DSP, Digital Signal Processor) based on a control algorithm.

Figure 3:
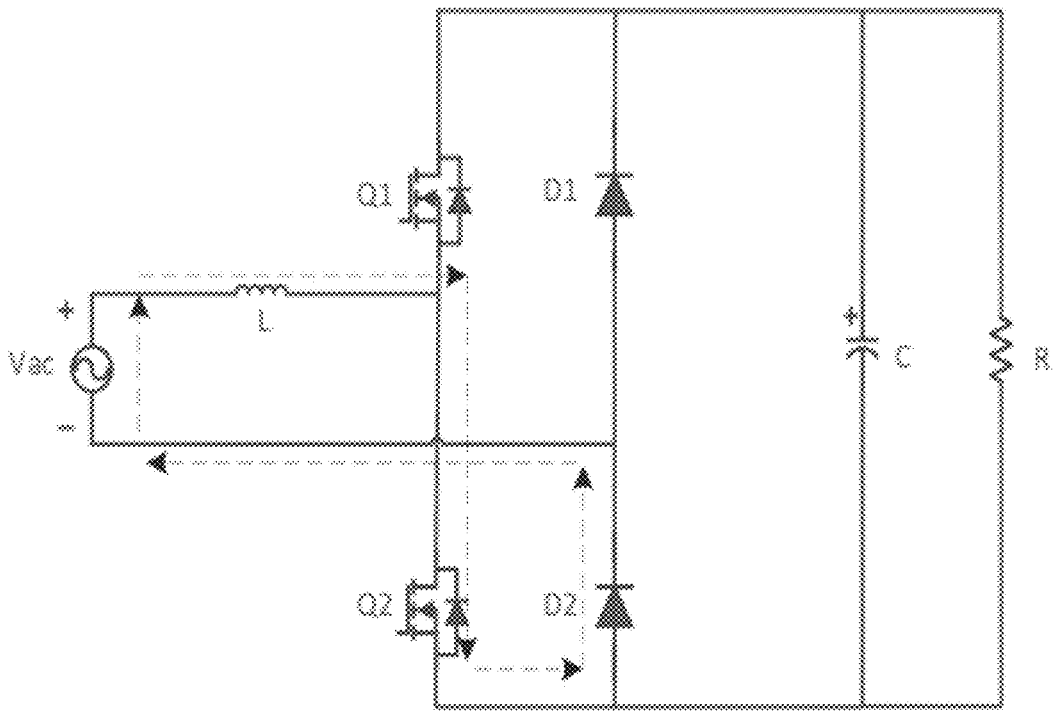
FIGS. 3 and 4 schematically show the current flow of the converter in two phases in the case of a positive half-wave of the input AC supply voltage.
Figure 4:
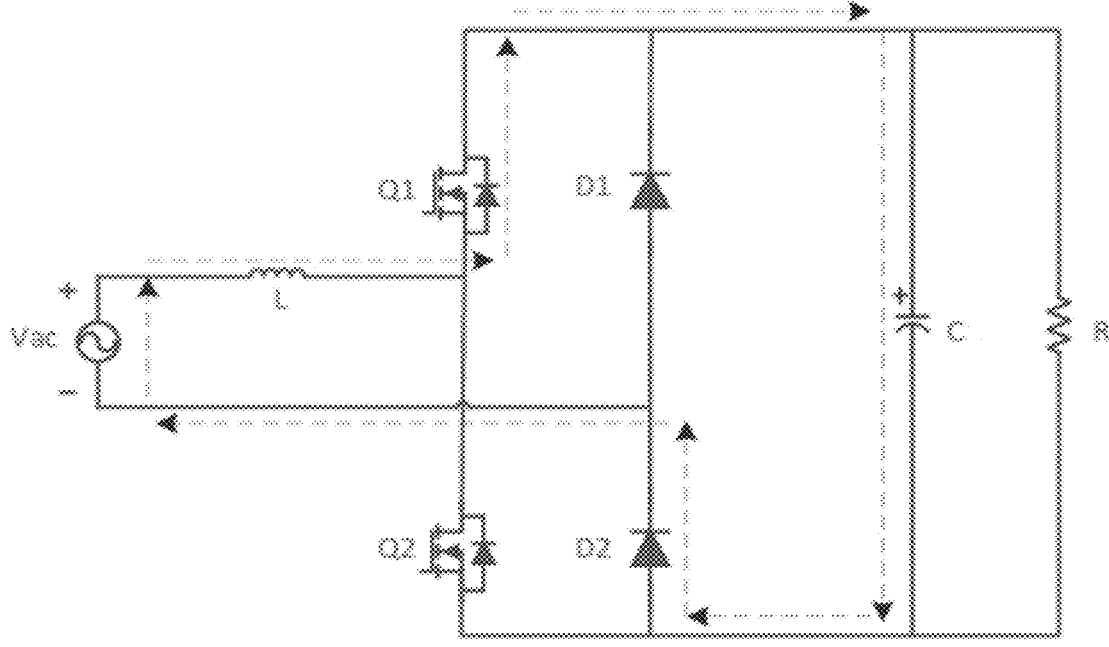
Figure 5:
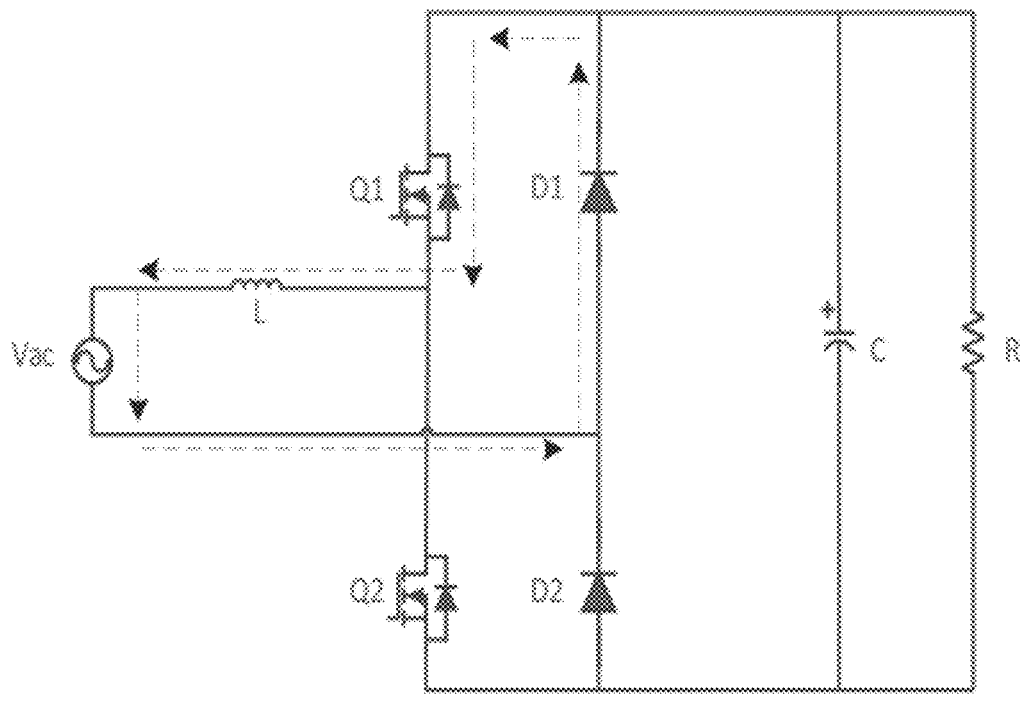
FIG. 5 schematically shows the reverse flow of the inductive current of the converter in DCM mode.

Referring to FIG. 6, during the period 0 to t1, the first initial drive level S1 of the first switching tube Q1 is a logic low level, so the first switching tube Q1 as freewheeling switch is turned off, and the second initial drive level S2 of the second switching tube Q2 is a logic high level, so the second switching tube Q2 as main switch is turned on. The current flow in this case is shown in FIG. 3. During the period t1 to t2, the first initial drive level S1 is a logic high level, and the second initial drive level S2 is a logic low level, so the first switching tube Q1 is turned on and the second switching tube Q2 is turned off. The current flow direction in this case is shown in FIG. 4. It can be seen that diode D2 is always conducting in FIGS. 3 and 4. It should be pointed out here that the inductive current $i_L$ in FIG. 4 flows through the body of the first switching tube Q1 and does not flow through its body diode (also called a parasitic diode, that is, the one next to the first switching tube Q1 and in parallel with it in FIG. 4), because the conduction voltage of the body diode is much greater than the conduction voltage of the switching tube, the inductive current $i_L$ preferentially flows through its body when the first switching tube Q1 is turned on. During the period t2 to t3, the first initial drive level S1 is still a logic high level, and the second initial drive level S2 is still a logic low level, so the first switching tube Q1 is still turned on, and the second switching tube Q2 is still cut off. But at time point t2, the inductive current $i_L$ begins to change from positive to negative through the zero point, that is, a reverse direction occurs. The current flow direction in this case is shown in FIG. 5. Therefore, in the case of Vac>0, during the period t2 to t3, due to the reverse direction of the inductive current in, flowing through the inductor L, the aforementioned problems causing additional losses and reduced power factor values occur. Similarly, the same problem occurs when Vac<0.

The characteristics of the switching tube are explained as follows. As long as the drive level applied to the gate G of the switching tube is greater than its threshold voltage, the switching tube will be turned on. Otherwise, it will be turned off. When the switching tube is turned on, the inductive current $i_L$ of the switching tube can flow from the drain D to the source S, such as flowing from top to bottom through the second switching tube Q2 in FIG. 3 and flowing from top to bottom through the first switching tube Q1 in FIG. 5. But it can also flow from the source S to the drain D, such as flowing from bottom to top through the first switching tube Q1 in FIG. 4. The specific flow direction depends on which one of the source S and the drain D has a higher voltage, and specifically depends on the current flowing through the inductor in the circuit topology of the present disclosure. When the negative half-wave of the input voltage Vac, namely Vac<0, the first switching tube Q1 is as main switch, the second switching tube Q2 is as freewheeling switch, and the diode D1 is always turned on. The specific working process is the similar to that when Vac>0, especially symmetrical to it.

In order to solve the above-mentioned problems caused by the reverse direction of the inductive current $i_L$ during the period t2 to t3, an "extensive" one-size-fits-all solution is adopted in the existing technology. Specifically, after the PFC converter enters the DCM mode, the driving voltage of the freewheeling switch is set to zero to turn it off. However, in order to ensure sufficient margin, when the load of the PFC converter reaches, for example, 30% to 40% of its rated load, the freewheeling tube is switched, regardless of when the current flowing through the inductor reverses, that is, the inductive current is not measured. For example, at a certain time between t1 and t2 in FIG. 6, the first initial drive level S1 of the freewheeling tube, namely the first switching tube Q1 is switched from a logic high level to a logic low level, so the first switching tube Q1 is turned off, and the inductive current $i_L$ cannot flow through the body of the first switching tube Q1. However, the inductive current $i_L$ still has the tendency to continue to flow in the original direction, so it has to find a new path to flow through the body of the first switching tube Q1. The current flow direction at this time is as shown in FIG. 4. As mentioned before, the conduction voltage of the body diode of the first switching tube Q1 is much greater than the conduction voltage of the body of the first switching tube Q1, that is, the voltage drop on the body diode is large. Therefore, the inductive current $i_L$ flowing through the body diode of the freewheeling switch will cause the loss of the freewheeling switch to increase, thus significantly reducing the efficiency of the PFC converter.

Figure 7:
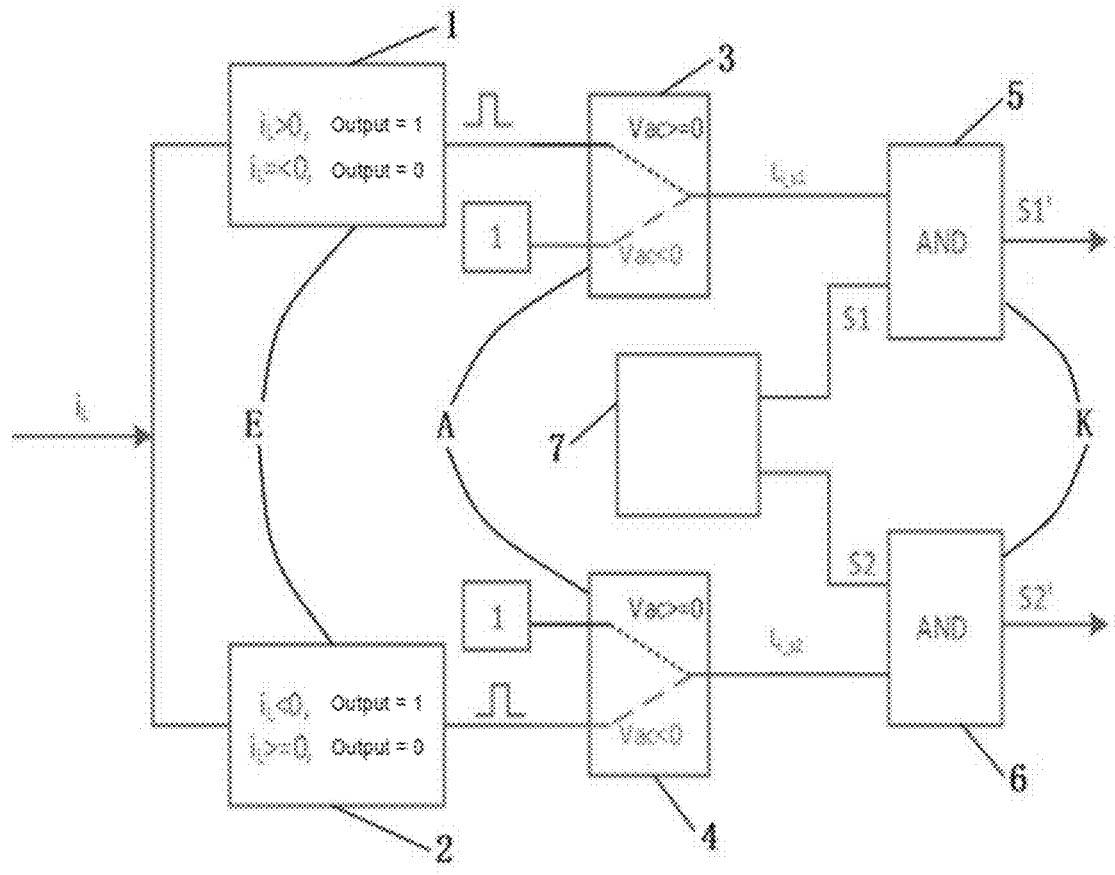
FIG. 7 schematically shows the topology of the drive circuit device according to the present disclosure for the converter.

In order to solve the above-mentioned problems of inductive current reverse and low efficiency of PFC converter, the present disclosure provides a simple solution that is easy to implement, see FIG. 7, which is all logic operations. The key to this solution is to turn off the freewheeling switch in time, for which the driving voltage applied to its gate G needs to be adjusted. Next, the solution of the present disclosure will be described in detail with reference to FIGS. 7 to 9.

Referring to FIG. 7, the driving circuit device for a totem pole power factor correction converter according to the present disclosure includes a controller 7, a current judgment circuit E, a selector A and a calculator K. The controller 7 is, for example, a processor or a DSP (or any device that can achieve the same function), which is used to control or generate the initial drive level of the switching tube of the converter. Here, the switching tube at least includes, for example, the interconnected first switching tube Q1 and the second switching tube Q2 shown in FIGS. 1 to 5, both of which are broadband gap semiconductor devices (such as SiC MOS or GaN FET) operating at high frequency (tens of kHz to hundreds of kHz). In this case, the initial drive level output by the controller 7 at least includes a first initial drive level S1 for controlling the first switching tube Q1 and a second initial drive level S2 for controlling the second switching tube Q2. It should be pointed out here that in the solution according to the present disclosure shown in FIG. 7, the first initial drive level S1 and the second initial drive level S2 are not directly applied to the first switching tube Q1 and the second switching tube Q2, respectively. Instead, it is only used as the initial drive level to control the first switching tube Q1 and the second switching tube Q2. The drive level directly applied to the gates of the first switching tube Q1 and the second switching tube Q2 is actually the target driving level, as detailed below.

In one embodiment, the current judgment circuit E is used to determine whether the inductive current $i_L$ of the converter crosses zero or not. To this end, the current judgment circuit E includes, for example, a first comparator 1 and a second comparator 2 (or any device that can realize the same current judgment function). In response to the inductive current $i_L$ crossing zero from positive to negative, the output level of the first comparator 1 changes from logic high level 1 to logic low level 0. That is to say, when the inductive current $i_L$ is always greater than zero, $i_L>0$, the output of the first comparator 1 is 1, and when the inductive current $i_L$ decreases to less than or equal to zero, $i_L<=0$, the output of the first comparator 1 is 0. In response to the inductive current $i_L$ crossing zero from negative to positive, the output level of the second comparator 2 changes from logic high level 1 to logic low level 0. That is to say, when the inductive current in, is always less than zero, $i_L<0$, the output of the second comparator 2 is 1, and when the inductive current $i_L$ increases to be greater than or equal to zero, $i_L>=0$, the output of the second comparator 2 is 0.

In one embodiment, the selector A is connected to the current judgment circuit E and is used to select the output level of the current judgment circuit E or the logic high level 1 based on the comparison result of the converter's power supply voltage Vac and 0, and output it as the intermediate control level. For this purpose, the selector A includes, for example, a third comparator (not shown) for comparing the supply voltage Vac of the converter with zero. Specifically, the selector A may also include, for example, a first selection switch 3 and a second selection switch 4 (or any device that can implement the same level selection function), and the intermediate control level includes the first intermediate control level $L_{i\_s1}$ output by the first selection switch 3 and the second intermediate control level $L_{i\_s2}$ output by the second selection switch 4. In some embodiments, the first selection switch 3 is connected to the first comparator 1 and outputs the preset logic level as the first intermediate control level $L_{i\_s1}$ when the power supply voltage Vac of the converter is less than 0, Vac<0. Otherwise, when the power supply voltage Vac is greater than or equal to 0, Vac>=0, the output level of the first comparator 1 is output as the first intermediate control level $L_{i\_s1}$. Correspondingly, for example, it is possible that the second selection switch 4 is connected to the second comparator 2 and outputs the preset logic level as the second intermediate control level $L_{i\_s2}$, when the power supply voltage Vac of the converter is not less than 0, Vac>=0. Otherwise, when the power supply voltage Vac is less than 0, Vac<0, the output level of the second comparator 2 is output as the second intermediate control level $L_{i\_s2}$. Here, the preset logic level may be a logic high level 1, for example. In one embodiment of the present disclosure, the preset logic level may also be a logic low level 0, and the logic low level 0 may be inverted using, for example, an inverter to finally obtain a logic high level 1.

In one embodiment, the calculator K is connected to the selector A, and is used to perform a logical operation on the intermediate control level and the initial drive level, and generate a target drive level for driving the switch tube. In one embodiment of the present disclosure, the logical operation is, for example, a logical AND operation, or it can be any other operation that finally obtains a logical AND result after going through some steps. Here, for example, the calculator K includes a first AND gate 5 and a second AND gate 6 (or any device that can implement the same AND function). The first AND gate 5 performs an AND operation of the first intermediate control level $L_{i\_s1}$ and the first initial drive level S1, and the second AND gate 6 performs an AND operation of the second intermediate control level $L_{i\_s2}$ and the second initial drive level S2. Then, the target drive level includes a first target drive level S1' output by the first AND gate 5 and the second target drive level S2' output by the second AND gate 6, and the first target drive level S1' is applied to the gate of the first switching tube Q1 to drive the first switching tube Q1, and the second target driving level S2' is applied to the gate of the second switching tube Q2 to drive the second switching tube Q2.

According to another aspect, the present disclosure also relates to a driving method for a totem pole power factor correction converter, the driving method is implemented using a driving circuit arrangement according to the preceding aspect. The working principle of the driving circuit device will be described in detail below in conjunction with the driving method of the present disclosure with reference to FIGS. 7 to 9.

First, a controller 7 such as a processor or DSP is used to generate the first initial drive level S1 and the second initial drive level S2 respectively for controlling the first switching tube Q1 and the second switching tube Q2 of the PFC converter. Subsequently, the inductive current $i_L$ flowing through the inductor L of the PFC converter is detected, and the current judgment circuit E is used to determine whether the inductive current $i_L$ of the converter crosses zero. When detecting the inductive current $i_L$, various detection manners such as current transformer, resistor shunt, and Hall device can be used.

Figure 8:
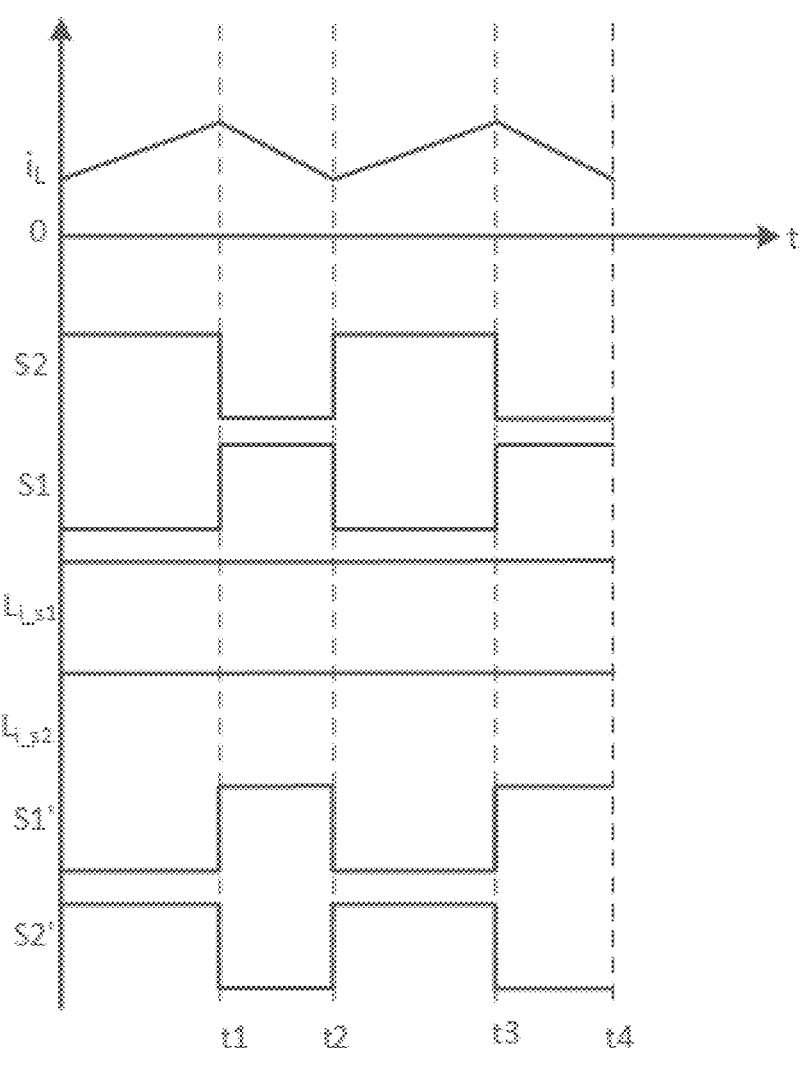
FIG. 8 is a schematic diagram of the timing corresponding to the drive level of the switching tube and the inductive current in the CCM mode of the drive circuit device of FIG. 7 when the input AC power supply voltage is a positive half wave.

For example, in the CCM mode shown in FIG. 8, when the positive half-wave of the AC power supply voltage is Vac>=0, the inductive current $i_L$ is always greater than zero, $i_L$>0. That is to say, the inductive current $i_L$ never reaches zero. Therefore, the output of the first comparator 1 is 1, and the output of the first selection switch 3 is the output of the first comparator 1, namely 1, and the first intermediate control level $L_{i\_s1}$=1. After performing the AND operation with the first AND gate 5 and the first initial drive level S1, the output of the first AND gate 5 is still the first initial drive level S1, namely the first target drive level S1'=S1 is used to drive the first switching tube Q1, which remains the same as the first initial drive level S1. At the same time, as shown in FIG. 7, because Vac>=0, the output of the second selection switch 4 is 1, and the second intermediate control level $L_{i\_s2}$=1. After performing the AND operation with the second AND gate 6 and the second initial drive level S2, the output of the second AND gate 6 is still the second initial drive level S2, namely the second target drive level S2'=S2 is used to drive the second switching transistor Q2 as main switch, which remains the same as the second initial drive level S2, as shown in FIG. 8.

Figure 9:
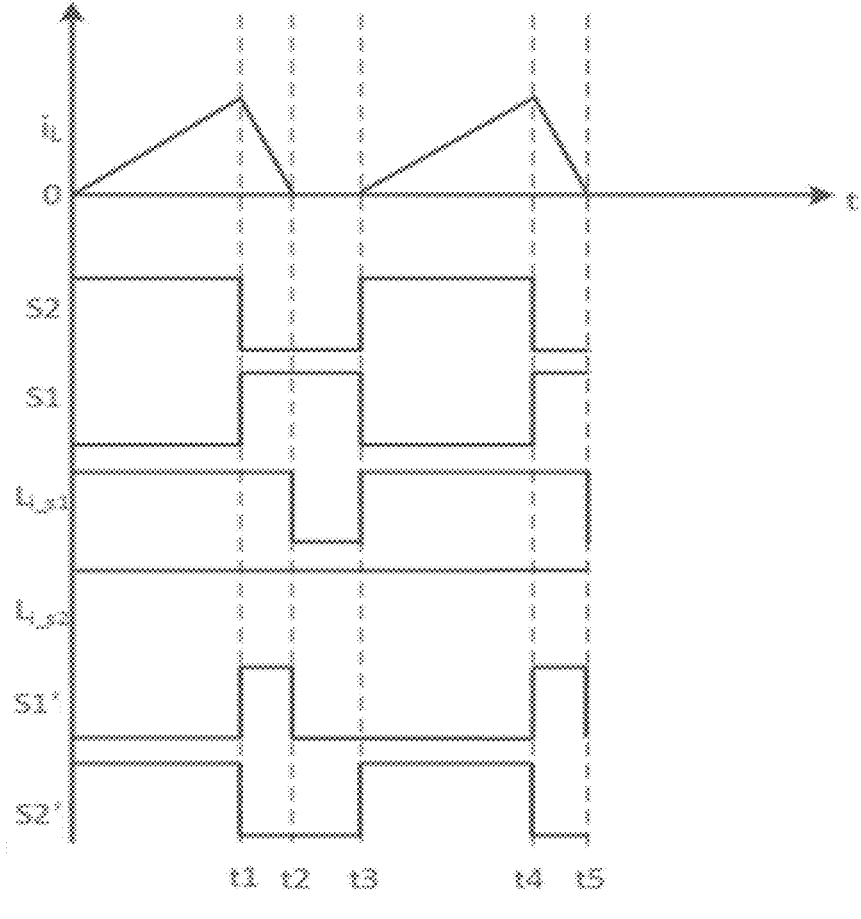
FIG. 9 is a schematic diagram of the timing corresponding to the drive level of the switching tube and the inductive current in the DCM mode of the drive circuit device of FIG. 7 when the input AC power supply voltage is a positive half wave.

In the DCM mode shown in FIG. 9, when the positive half-wave of the AC power supply voltage is Vac>=0, the first switching tube Q1 is a freewheeling switch, and it is necessary to adjust the driving voltage of the first switching tube Q1, so that it can be turned off in time when the inductive current crosses zero. Specifically, it is detected that the inductive current $i_L$ starts to cross zero from positive to negative at time t2, so the output of the first comparator 1 switches from 1 to 0, and at this time, the output of the first selection switch 3 is the output of the first comparator 1, that is, the first intermediate control level $L_{i\_s1}$ is also switched from 1 to 0. The first AND gate 5 performs an AND operation of the first intermediate control level $L_{i\_s1}$ and the first initial drive level S1, and its output result S1' is also switched from 1 to 0, so the drive voltage of the first switching tube Q1 changes from the initial S1=1 to the first target drive level S1'=0, so the first switching tube Q1 serves as a freewheeling switch and is turned off in time at the zero-crossing moment t2 of the inductive current $i_L$. This avoids the reverse direction of the inductive current caused by the continued conduction of the first switching tube Q1 as a freewheeling switching tube. At the same time, as shown in FIG. 7, because Vac>=0, the output of the second selection switch 4 is 1, that is, the second intermediate control level $L_{i\_s2}$=1. After performing the AND operation with the second AND gate 6 and the second initial drive level S2, the output of the second AND gate 6 is still the second initial drive level S2, that is, the second target driving level S2'=S2 is used to drive the second switching tube Q2 as main switch, which remains the same as the second initial drive level S2, as shown in FIG. 9. The above state lasts from t2 to t3, that is, until the next cycle begins.

When the negative half-wave of the AC power supply voltage is Vac<0, the second switching tube Q2 is a freewheeling switch, and it is necessary to adjust the driving voltage of the second switching tube Q2, so that it can be turned off in time when the inductive current crosses zero. At this time, the first switching tube Q1 serves as the main switch, and its first target driving level S1'=S1, that is, it remains the same as the first initial drive level S1. In this case, the second initial drive level S2 needs to be adjusted in time when the inductive current $i_L$ crosses zero from negative to positive, and the working process is similar to the above.

It can be seen from the above that by adopting the solution of the present disclosure, the inductive current reversal of the PFC converter in DCM mode is effectively avoided, the additional losses caused by it are eliminated, the power factor is improved, and the inductive current $i_L$ is prevented flowing through the body diode of the freewheeling switch, thereby further avoiding the increase in loss of the freewheeling switch and significantly improving the efficiency of the PFC converter. Moreover, the topology of the driving circuit device of the present disclosure is relatively simple and easy to implement. Only a few comparators and selector switches or similar functional devices are needed, and the cost is very low.

Figure 10:
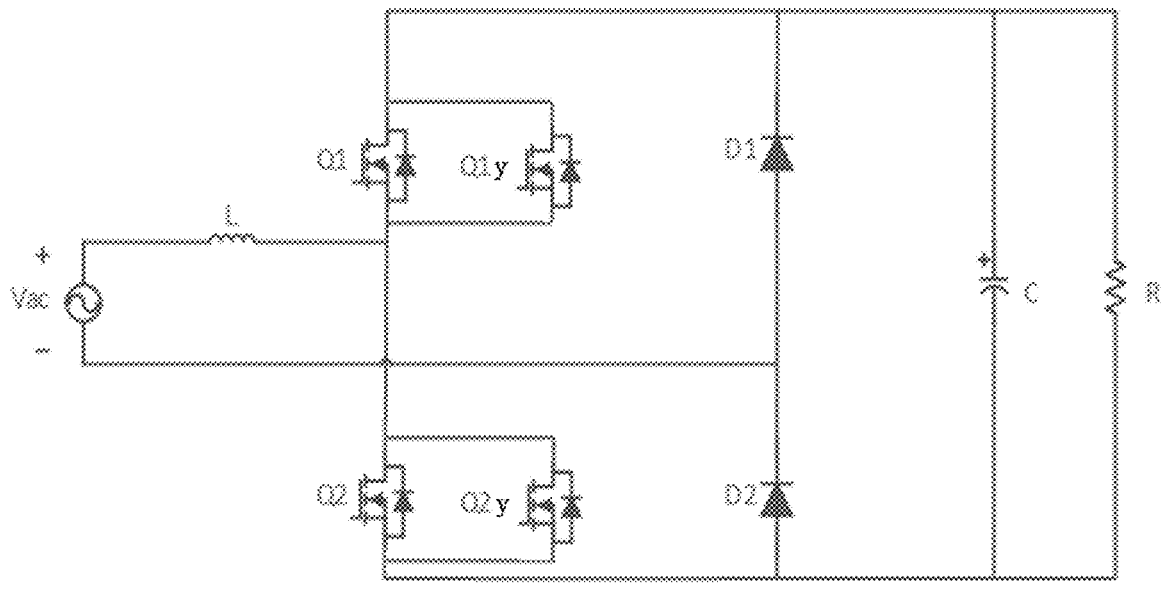
FIG. 10 schematically shows an expansion scheme of the circuit topology shown in FIG. 1 that can use the drive circuit device shown in FIG. 7, in which every two switching tubes are connected in parallel.

The above solution of the present disclosure can be applied not only to the circuit topology of FIG. 1 and FIG. 2, but also to any suitable extended circuit topology. For example, the first switching tube Q1 includes a plurality of first switching tubes Q1 connected in parallel, and the second switching tube Q2 include a plurality of second switching tubes Q2 connected in parallel. That is, a plurality of first switching tubes Q1 are connected in parallel with each other and a plurality of second switching tubes Q2 are connected in parallel with each other. For example, in the circuit topology shown in FIG. 10, the first switching tube Q1 and another first switching tube Q1y are connected in parallel with each other, and the second switching tube Q2 and another second switching tube Q2y are connected in parallel with each other. The above solution of the present disclosure can also be applied to another extended circuit topology, in which a high-frequency half-bridge is formed by the first switching tube Q1 and the second switching tube

11

Figure 11:
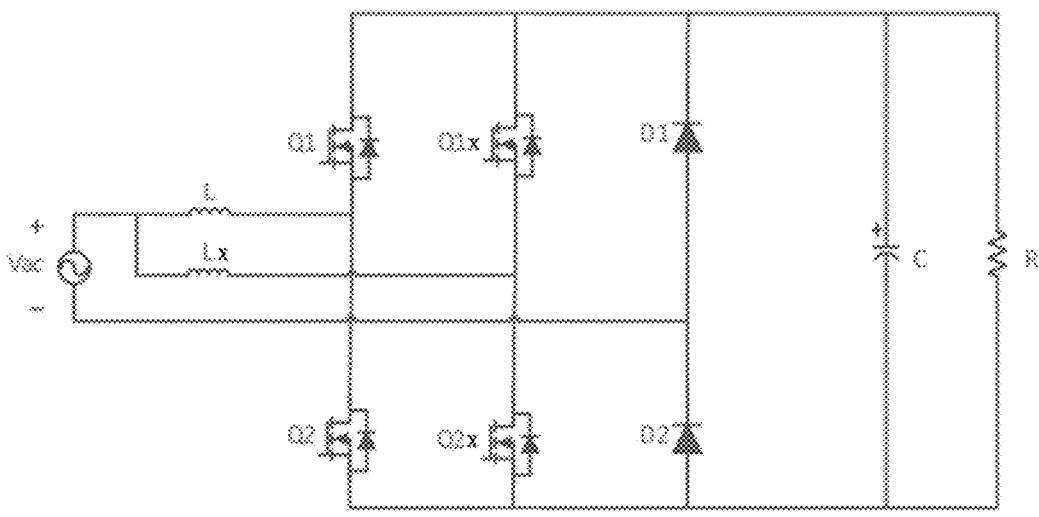
FIG. 11 schematically shows another expansion scheme of the circuit topology shown in FIG. 1 that can use the drive circuit device shown in FIG. 7, in which two groups of switching tubes are staggered and connected in parallel.

Q2, and multiple high-frequency half-bridges are staggered and connected in parallel. That is to say, multiple high-frequency half-bridges are connected in parallel, and an inductor is connected between the middle (namely, the point between the two high-frequency switching tubes on the same high-frequency half-bridge) of each half-bridge and the power supply. For example, in FIG. 11, a high-frequency half bridge is formed by the first switching tube Q1 and the second switching tube Q2. An inductor L is connected to a certain point between the first switching tube Q1 and the second switching tube Q2. The other end of the inductor L is connected to the power supply. Another high-frequency half-bridge is formed by a further first switching tube Q1x and a further second switching tube Q2x. These two high-frequency half-bridges are connected in parallel with each other. Another inductor Lx is connected to a certain point between the further first switching tube Q1x and the further second switching tube Q2x. The other end of the another inductor L is connected to the power supply.

Furthermore, the present disclosure also relates to a totem pole power factor correction converter comprising the aforementioned driving circuit device. The aspects and advantages described above with respect to the driving circuit device are correspondingly also applicable to the totem pole power factor correction converter, and the details are omitted here.

From the disclosure and teaching presented in the foregoing descriptions and drawings, many modifications and other implementations will come to those skilled in the relevant art. Therefore, it is to be understood that the embodiments of the present disclosure are not to be limited to the specific embodiments disclosed herein, and modifications and other embodiments are also included in the present disclosure. Furthermore, while the above description and drawings describe example embodiments in the context of certain example combinations of components and/or functions, it should be appreciated that different combinations of components and/or functions may be provided by alternative embodiments without departing from the scope of the present disclosure. In this regard, for example, other combinations of components and/or functions than those expressly described above are also contemplated to be within the scope of the present disclosure. Although specific terms are used herein, they are used in a generic and descriptive sense and are not intended to be limiting.

We claim:

1. A driving circuit device for a totem pole power factor correction converter, the driving circuit device comprising:
   a controller configured to control an initial drive level of a switching tube of the converter;
   a current judgment circuit configured to determine whether an inductive current of the converter crosses zero or not;
   a selector configured to:
      compare a power supply voltage of the converter with zero; and
      select, based on a result of the comparison, one of an output level of the current judgment circuit and a preset logic level as an intermediate control level to be output; and
   a calculator configured to perform a logical operation on the intermediate control level and the initial drive level to generate a target drive level for driving the switching tube.

2. The driving circuit device according to claim 1, wherein the current judgment circuit comprises a first comparator and a second comparator, and wherein the first comparator is configured to change, in response to the inductive current crossing zero from positive to negative, the output level from a logic high level to a logic low level, and the second comparator is configured to change, in response to the inductive current crossing zero from negative to positive, the output level from a logic high level to a logic low level.

3. The driving circuit device according to claim 2, wherein the selector comprises a first selection switch and a second selection switch, and the intermediate control level comprises a first intermediate control level output by the first selection switch and a second intermediate control level output by the second selection switch.

4. The driving circuit device according to claim 3, wherein the first selection switch is connected to the first comparator and is configured to:
   output, in response to the power supply voltage of the converter being less than zero, the preset logic level as the first intermediate control level; or
   output, in response to the power supply voltage of the converter being not less than zero, the output level of the first comparator as the first intermediate control level.

5. The driving circuit device according to claim 3, wherein the second selection switch is connected to the second comparator and is configured to:
   output, in response to the power supply voltage of the converter being not less than zero, the preset logic level as the second intermediate control level; or
   output, in response to the power supply voltage of the converter being less than zero, the output level of the second comparator as the second intermediate control level.

6. The driving circuit device according to claim 3, wherein the switching tube at least comprises a first switching tube and a second switching tube connected to each other, and the initial drive level output by the controller comprises a first initial drive level for controlling the first switching tube and a second initial drive level for controlling the second switching tube.

7. The driving circuit device according to claim 6, wherein the calculator comprises a first AND gate and a second AND gate, the first AND gate is configured to perform an AND operation of the first intermediate control level and the first initial drive level, and the second AND gate is configured to perform an AND operation of the second intermediate control level and the second initial drive level.

8. The driving circuit device according to claim 7, wherein the target drive level comprises a first target drive level output by the first AND gate and a second target drive level output by the second AND gate, the first target drive level is configured to drive the first switching tube, the second target drive level is configured to drive the second switching tube.

9. The driving circuit device according to claim 8, wherein:
   the first switching tube comprises a plurality of first switching tubes connected in parallel, and the second switching tube comprises a plurality of second switching tubes connected in parallel; and/or
   a plurality of half-bridges composed of the first switching tube and the second switching tube are staggered and connected in parallel, the plurality of half-bridges are connected in parallel with each other, and an inductor is connected between a middle of each half-bridge and a power supply of the converter that is configured to generate the power supply voltage; and/or the preset logic level is a logic high level, and the logical operation is a logic AND operation.

10. The driving circuit device according to claim 7, wherein:

the first switching tube comprises a plurality of first switching tubes connected in parallel, and the second switching tube comprises a plurality of second switching tubes connected in parallel; and/or a plurality of half-bridges composed of the first switching tube and the second switching tube are staggered and connected in parallel, the plurality of half-bridges are connected in parallel with each other, and an inductor is connected between a middle of each half-bridge and a power supply of the converter that is configured to generate the power supply voltage; and/or the preset logic level is a logic high level, and the logical operation is a logic AND operation.

11. The driving circuit device according to claim 6, wherein the first switching tube comprises a plurality of first switching tubes connected in parallel, and the second switching tube comprises a plurality of second switching tubes connected in parallel.

12. The driving circuit device according to claim 6, wherein a plurality of half-bridges composed of the first switching tube and the second switching tube are staggered and connected in parallel, and wherein the plurality of half-bridges are connected in parallel with each other and an inductor is connected between a middle of each half-bridge and a power supply of the converter that is configured to generate the power supply voltage.

13. The driving circuit device according to claim 6, wherein the preset logic level is a logic high level, and the logical operation is a logic AND operation.

14. A totem pole power factor correction converter comprising:

a driving circuit device comprising:

a controller configured to control an initial drive level of a switching tube of the converter;

a current judgment circuit configured to determine whether an inductive current of the converter crosses zero or not;

a selector configured to:

compare a power supply voltage of the converter with zero; and select, based on a result of the comparison, one of an output level of the current judgment circuit and a preset logic level as an intermediate control level to be output; and a calculator configured to perform a logical operation on the intermediate control level and the initial drive level to generate a target drive level for driving the switching tube.

15. The totem pole power factor correction converter according to claim 14, wherein:

the current judgment circuit comprises a first comparator and a second comparator, and wherein the first comparator is configured to change, in response to the inductive current crossing zero from positive to negative, the output level from a logic high level to a logic low level, and the second comparator is configured to change, in response to the inductive current crossing zero from negative to positive, the output level from a logic high level to a logic low level.

16. The totem pole power factor correction converter according to claim 15, wherein:

the selector comprises a first selection switch and a second selection switch, and the intermediate control level comprises a first intermediate control level output by the first selection switch and a second intermediate control level output by the second selection switch.

17. The totem pole power factor correction converter according to claim 16, wherein:

the first selection switch is connected to the first comparator and is configured to:

output, in response to the power supply voltage of the converter being less than zero, the preset logic level as the first intermediate control level; or output, in response to the power supply voltage of the converter being not less than zero, the output level of the first comparator as the first intermediate control level.

18. A method of driving a totem pole power factor correction converter, the method comprising:

generating an initial drive level of a switching tube of the converter;

determining whether an inductive current of the converter crosses zero or not;

generating a corresponding output level according to whether the inductive current crosses zero from positive to negative or from negative to positive;

comparing a power supply voltage of the converter with zero;

selecting, based on a result of the comparison, one of the output level and a preset logic level as an intermediate control level to be output; and performing a logical operation on the intermediate control level and the initial drive level to generate a target drive level for driving the switching tube.

19. The method according to claim 18, wherein the preset logic level is a logic high level, and the logical operation is a logic AND operation.

20. The method according to claim 18, further comprising:

changing, in response to the inductive current crossing zero from positive to negative, the output level from a logic high level to a logic low level; and changing, in response to the inductive current crossing zero from negative to positive, the output level from a logic high level to a logic low level.

* * * * *